May 31, 1960 J. D. BALL 2,939,107
RECORDATION OF SEISMIC SIGNALS
Filed July 1, 1957 3 Sheets-Sheet 1

INVENTOR.
John D. Ball,
BY
John B. Davidson
ATTORNEY.

May 31, 1960      J. D. BALL      2,939,107

RECORDATION OF SEISMIC SIGNALS

Filed July 1, 1957      3 Sheets-Sheet 2

INVENTOR.
John D. Ball,

BY *John B. Davidson*

ATTORNEY.

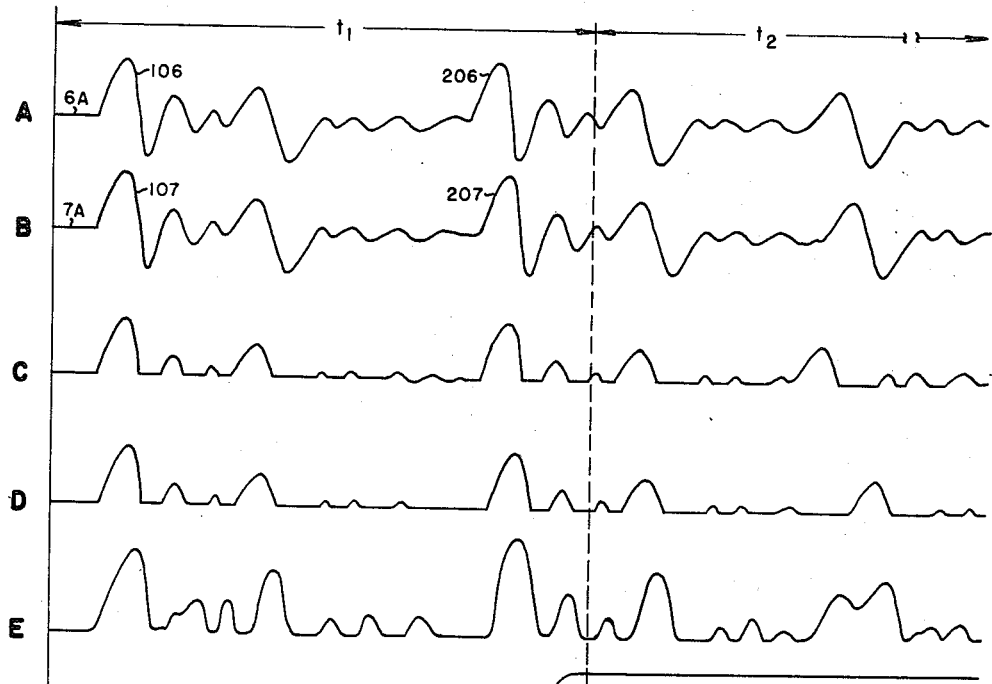

United States Patent Office 2,939,107
Patented May 31, 1960

2,939,107

RECORDATION OF SEISMIC SIGNALS

John D. Ball, Harris County, Tex., assignor, by mesne assignments, to Jersey Production Research Company, Tulsa, Okla., a corporation of Delaware Filed July 1, 1957, Ser. No. 669,264

5 Claims. (Cl. 340—15)

This invention relates to improvements in apparatus for and methods of receiving and recording seismic waves in connection with geophysical prospecting, and more particularly to means for controlling the gain of seismic amplifiers used in the receiving and recording of seismic waves.

In the course of geophysical prospecting utilizing seismic techniques, it is common practice to initiate earth vibrations by detonating an explosive charge or by dropping a heavy weight on the earth's surface, and thereafter to detect the earth tremors at one or more points spaced from the source of earth vibrations. The vibrations detected by the individual geophones travel various paths from their source. A portion of the shock energy penetrates downwardly through the earth and is reflected and refracted from subterranean reflecting and refracting horizons (such as strata interfaces, fault planes, and the like), so as to reach the geophones by indirect paths. However, some of the energy travels through the topmost layer of the earth or through high velocity layers close to the earth's surface to reach the detecting positions by a more or less direct path. The output signals produced by the geophones generally comprise an initial high amplitude wave group corresponding to these first arriving waves, usually termed first arrivals, followed by a series of waves of generally decreasing amplitude. Some of the waves arriving after the first arrivals are of considerably higher amplitude than the others and are produced by waves which have been reflected or refracted upwardly from the subterranean reflecting and refracting horizons.

The output signals of the geophones are generally not of sufficient strength to be recorded directly on recording apparatus available at the present time. The signals, therefore, must be electrically amplified to actuate the recording means. At the present time, it is common practice to utilize magnetic tapes as the recording media for the output signals of seismic amplifiers.

As stated, the first arrivals at the geophones are of substantially higher amplitude than are the later waves. However, the later-arriving waves generally contain the information which is of greatest interest in determining the nature of complex subterranean geological structure. The waves produced by the geophones may vary over a range in excess of 80 db. Manifestly, if ordinary amplifiers are used and if the gain of the amplifier coupled to the output of an individual geophone is adjusted so that the signal produced by the first arrival thereat is recorded at a moderate amplitude, many of the electrical signals produced by the later arrivals will not be recorded at all. Likewise, if the gain is adjusted so that signals produced by the later arrivals will be recorded, the signals produced by first-arrivals will have such a high amplitude as to go beyond the recording capacity of the recording medium. Since recording tapes available at the present time have a maximum useful dynamic range of only 30 to 40 db, it is necessary to provide means for varying the gain or amplification factor of seismic amplifiers to permit faithful recording of all of the output signals from a geophone produced as a result of initiation of a seismic disturbance. In the past, it has been common practice to use various types of automatic volume control circuitry that vary the gain of a seismic amplifier inversely as the strength of an incoming signal. In general, automatic volume control circuits do not permit later reproduction of recorded signals in a form that will allow one to determine the relative amplitudes of the detected seismic waves. This type of information can be of considerable value in discerning between waves having random phase and amplitude and waves having regular phase and amplitude. In correlating the output signals of a plurality of geophones, or in examining the signal from a single geophone, knowledge of the relative amplitudes of detected seismic signals can be of considerable importance. In correlating the signals produced as a result of a number of seismic disturbances from the same or immediately adjacent points, it is also important to have an indication of the amount of energy coupled to the ground by the explosive charge or by dropping a weight on the earth's surface. With automatic correlation of seismic recordings, automatic volume control circuits can become particularly objectionable since they produce signal components that cannot be subtracted from the recorded data by the correlating equipment. Attempts have been made to modify automatic volume control circuit to overcome the inherent disadvantages thereof, such, for example, as is shown in U.S. Patent No. 2,286,106 to O. F. Ritzmann, but such circuits usually have proven ineffective.

Accordingly, it is one object of this invention to provide apparatus for controlling the gain of a seismic amplifier in accordance with the amount of energy coupled to the earth by seismic wave producing means.

Another object is to provide apparatus for recording output signals of seismic wave pickup devices so that the recorded signals can be reproduced in a manner most indicative of the relative amplitudes of the signals detected by the pickup devices.

Another object is to provide apparatus for recording seismic waves while introducing a minimum amount of distortion by the detecting, amplifying, and recording apparatus.

Another object is to provide apparatus for affording a calibrated recording of output signals of seismic wave pickup devices.

Other objects and features of the invention will become apparent upon consideration of the following description thereof when taken in conjunction with the accompanying drawings, wherein.

Figure 3:
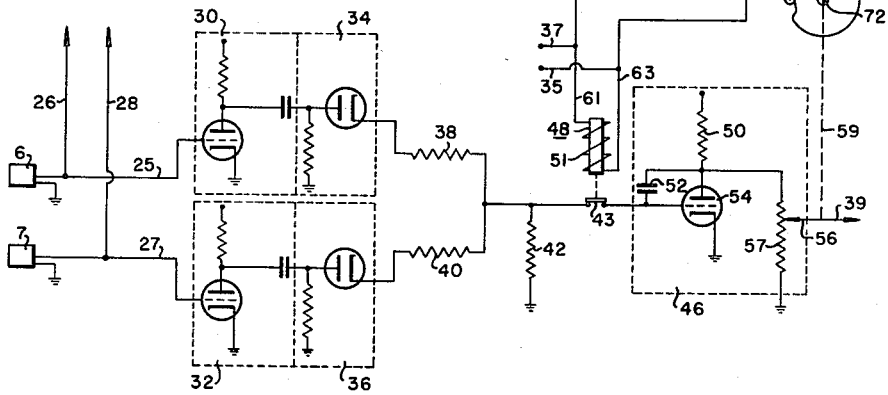
Fig. 3 is a schematic diagram showing the circuit details of a portion of the apparatus depicted in Fig. 1.
Figure 5:
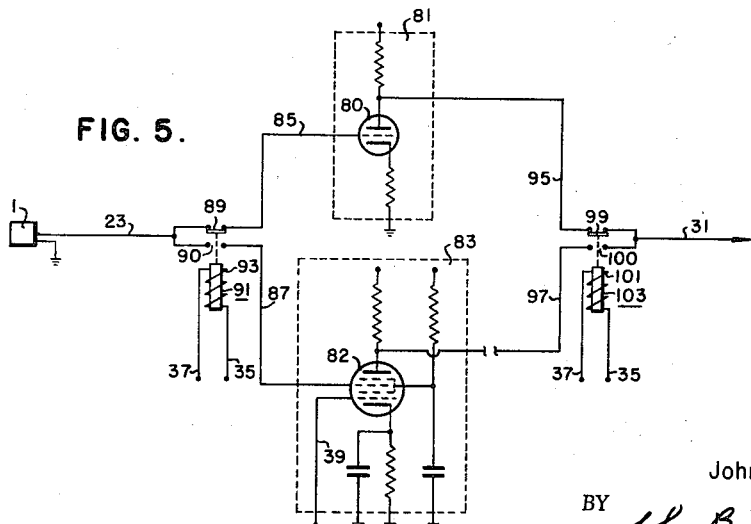
Fig. 5 is a schematic diagram of a seismic amplifier such as can be used in the apparatus of Fig. 1.

Fig. 6 presents waveform representations of signals at various points in the circuitry of Fig. 3, which waveform representations are useful in understanding the operation of the invention;

Fig. 7 is a waveform of the voltage appearing across vacuum tube 54 in the circuit of Fig. 3;

Fig. 8 is a waveform representation of the voltage appearing between potentiometer tap 56 and ground in the circuit of Fig. 3; and Fig. 9 depicts the gain of the first-arrival amplifier 81 and the gain of reflection amplifier 83 of Fig. 5, both plotted as a function of time.

In accordance with one aspect of the invention, the gain of a seismic amplifier is controlled by a voltage derived by integrating the output signals of one or more geophones positioned near the point at which a seismic disturbance is to be initiated. It has been discovered that by integrating such geophone output signals over a period extending from the time at which the seismic disturbance is initiated to an instant slightly past the time at which first reflections are received from subterranean horizons, a control voltage will be derived that is indicative of the amount of energy coupled to the earth. By exponentially decreasing this voltage according to a predetermined time function, the voltage can be used to control the amplification of the seismic amplifier after the integrating process has ceased. In a preferred form of the invention, an integrating amplifier is utilized to integrate the geophone output signals, and a non-linear potentiometer is coupled across the integrating amplifier output circuit to derive the exponentially decreasing voltage. The tap on the potentiometer is varied or driven by the motor of the recording device (on which seismic signals are being recorded) so that the position of the tap can be calibrated as a function of time from initiation of the seismic disturbance. The voltage appearing at the potentiometer tap is used to control the amplification of the seismic amplifying means.

Figures 1, 2:
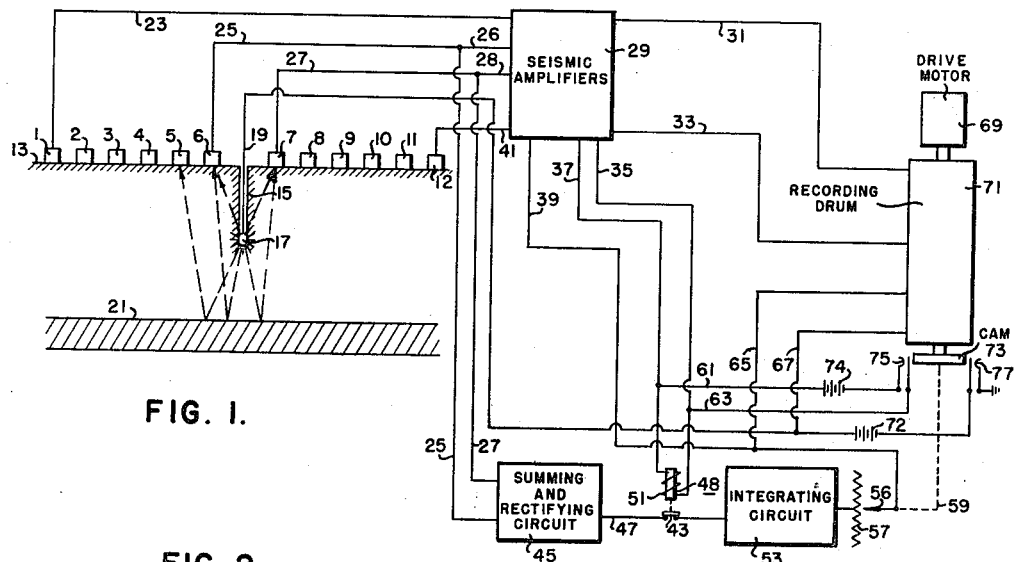
Fig. 1 is a diagram in block form showing an embodiment of the invention.
Fig. 2 is a waveform representation of output signals produced by geophones, as shown in Fig. 1, as a function of time, which waveform representations are useful in understanding the invention.

With reference now to Fig. 1, there is shown a plurality of seismic pickup devices or geophones bearing reference numerals 1 through 12, symmetrically positioned with respect to shot hole 15. Any arrangement or pattern of geophones may be used in accordance with the teachings of the prior art; the symmetrical positioning of geophones 1 through 6 on one side of shot hole 15 and of geophones 7 through 12 on the other side of shot hole 15 is shown for illustrative purposes only. An explosive charge 17 is placed in shot hole 15. Electrical conductor 19 is connected to charge 17 for the purpose of conducting electrical energy from battery 72 for detonation of the charge. Other devices known in the prior art for initiating seismic waves may be utilized, such as a heavy weight dropped on the surface of the ground.

The output signals of the geophones 1 through 12 are amplified by a bank of individual seismic amplifiers shown in block form and designated by reference numeral 29. To avoid confusion, only geophones 1, 6, 7, and 12 are shown connected to amplifier bank 29, it being understood that electrical connections for the output signals of the other geophones are also made to amplifier bank 29. The signals appearing on leads 23 and 41, which couples geophones 1 and 12 to seismic amplifiers 29, are amplified and appear on leads 31 and 33, and are recorded on a recording medium such as a recording drum or magnetic recording tape 71. The output signals of the seismic amplifiers corresponding to geophones 2 through 11 are not shown in order to avoid undue complexity in the drawing.

Leads 25 and 27 couple the output signals of geophones 6 and 7 to a summing and rectifying circuit 45, the function of which is to produce an output signal on lead 47 equal to the sum of the rectified signals appearing on leads 25 and 27. As will be described with respect to Fig. 3, half-wave rectified components of the electrical signals on leads 25 and 27 are added. The output signal of circuit 45 is applied to the input of an integrating circuit 53 through the contact 43 of relay 48. The integrating circuit is preferably a Miller-type integrator as such as will be described with respect to Fig. 3. In one embodiment of the invention, the output signals from circuit 53 are coupled to a potentiometer 57, the tap of which is mechanically connected to the drive shaft of recording drum 71 so as to be variably positioned along the resistive element of potentiometer 57 in accordance with the rotative movement of the recording drum. Recording drum 71 is driven by a drive motor 69 and includes means illustrated by cam 73 and contacts 75 and 77 for completing electrical circuits to explosive charge 17 and to the actuating coil 51 of relay 48 for the purpose of detonating explosive charge 17 and opening contacts 43. Contact 77 completes the circuit from electrical energy source 72 to the explosive charge 17 through the earth, while contact 75 completes the circuit from energy source 74 to actuating coil 51 through leads 61 and 63.

Electrical conductors or leads 35 and 37 interconnect the actuating windings of relays in seismic amplifiers 29 to electrical leads 61 and 63 for purposes to be described with respect to Fig. 5.

As shown in Fig. 3, the geophones 6 and 7 immediately straddling the shot hole 15, in addition to being connected to seismic amplifier 29 by electrical leads 25, 26, 27, and 28, are also connected to amplifying circuits 30 and 32, respectively. The output signals of amplifying circuits 30 and 32 are rectified by half-wave rectifier circuits 34 and 36, respectively. The rectified signals are electrically added by an electrical adding circuit comprising resistors 38, 40, and 42. Resistor 38 couples the output signals of rectifying circuit 34 to resistor 42; similarly, resistor 40 connects the output signal of half-wave rectifier circuit 36 to resistor 42.

The electrical signals appearing across resistor 42 are applied to circuit 46 by normally-closed relay contact 43. Circuit 46 and resistors 38 and 40 form a Miller integrator such as described in the textbook, "Waveforms" (1949, McGraw-Hill, vol. 19 of the M.I.T. Radiation Laboratory Series) at page 664. As shown, circuit 46 comprises a vacuum tube 54 with a capacitor 52 connected between the grid and plate electrodes thereof, the resistors 38 and 40 comprising the integrator input resistance. A resistor 50 couples the plate electrode to a source of plate voltage and the output signals of the vacuum tube 54 are applied to non-linear potentiometer 57 by means of lead 39. For a more complete description and analysis of the circuit, reference is made to the aforementioned textbook, "Waveforms." The advantage of utilizing an integrating amplifier rather than a simple resistive-capacitive integrating circuit is that linear integration over longer time limits can be achieved with practical sized resistors and capacitors. A further advantage is the increased size of the output voltage and the low output impedance. Preferably, potentiometer 57 should exhibit very little change in resistance as the tap is moved to a position corresponding to the point on cam 73 at which the relays are actuated. Thereafter, the change in resistance should be such as to exponentially decrease the voltage between tap and ground. To most effectively compensate for the diminishing strength of received seismic signals with time, the potentiometer should be wound so that the voltage will decrease in a manner to increase the gain approximately according to the empirically derived function $$V = Kt^{-5/2}$$

where K is a constant of proportionality and $t$ is time measured from initiation of the seismic disturbance.

As has been mentioned, tap 56 of potentiometer 57 is driven by drive shaft 72 of the recording device. Seismic amplifier bank 29 comprises a plurality of amplifier circuits such as the circuit shown in Fig. 5. The seismic amplifier of Fig. 5 will be described as that utilized to amplify the output signals of geophone 1, it being understood that similarly connected amplifiers are coupled to the other geophones for amplifying the output signals thereof. As shown, electrical lead 23 from geophone 1 is coupled to the control electrodes of vacuum tubes 80 and 82 by electrical contacts 89 and 90 of relay 91. Vacuum tube 80 is included in first-arrival amplifier 81 and vacuum tube 82 is a portion of reflection-amplifier 83. Actuating coil 93 is connected to electrical lead 35 and 37 so that the normally-closed relay contact 89 will be opened, and the normally-open relay contact 90 will be closed, when switch 75 is closed by cam 73 (see Fig. 1). Reflection amplifier 83 may be coupled directly through output lead 31 through normally-open contact 100 of relay 103, or if desired, other intermediate amplifiers may be inserted therebetween. The output lead 95 couples the output signals of first-arrival amplifier 81 to lead 31 through the normally-closed contacts 99 of relay 103. Relay 103 includes an actuating coil 101 which is energized through leads 35 and 37 to open contacts 99 and close contacts 100.

The operation of the circuitry described above is best understood with reference to Fig. 2 and Figs. 6 through 9. Fig. 2 illustrates, in conventional wiggly-trace form, typical output signals or traces of the various seismic pickups, traces 1A through 12A corresponding to geophones 1 through 12, respectively. The output signal from each of the geophones comprises an initial high amplitude wave group (designated 106 and 107 for traces 6A and 7A, respectively), which gradually dies out and which is followed by a high amplitude wave group (designated 206 and 207 for traces 6A and 7A) corresponding to first reflections from subsurface reflecting horizons. These signals decay and are followed by other high amplitude wave groups (corresponding to reflections from other subterranean reflecting horizons), which are of gradually diminishing amplitude.

Referring now to Fig. 6, waveforms A and B, respectively, correspond to the traces 6A and 7A of Fig. 2 depicting the output signals of geophones 6 and 7, respectively. Waveforms C and D represent the output signals from rectifiers 34 and 36, respectively. Waveform E represents the signal appearing across resistor 42 and depicts the instantaneous sum of waveforms C and D immediately thereabove. The reason for utilizing at least two geophones immediately straddling shot hole 15 to obtain a sum trace such as shown by waveform E of Fig. 6 is that there is a greater probability of obtaining a signal more truly indicative of the direct and reflected waves detected by all of the geophones.

Fig. 7 is a waveform of voltage appearing at the output of the Miller integrator as a function of time and represents the time integral of voltage of waveform E between $T=0$ and $T=t_1$ in Fig. 6. It is to be noted that the final voltage appearing across the output of the integration amplifier at the end of interval $t_1$ is the time integral of the input signal between the times $T=0$ and $T=t_1$ and not the short time average as would be provided by an R.C. integrator with the capacitor shunted by a discharge resistor used to bring about an exponential decay of the output voltage. In the Miller circuit, grid to ground resistance can be neglected during charging of the capacitor as the grid is virtually at ground potential and hence is unaffected by additional paths to ground. It has been found that in order to obtain an output voltage most truly indicative of the amount of energy coupled to the earth by the source of seismic disturbances, it is necessary to time integrate between certain time limits rather than average the output voltage appearing across resistor 42.

When charge 17 is detonated by the closing of switch 77 by cam 73, a sharp pulse is fed by conductor 67 to recording drum 71 to record the "break point" as depicted by trace 14 in Fig. 2. Relays 48, 91, and 103 will be in their normal positions with contacts 43, 89, and 99 closed. The output signals of the geophones will be coupled to the recording means by the first-arrival amplifiers thereof inasmuch as the control relays thereof, such as are designated by the reference numerals 91 and 103 of Fig. 5, will be in their normal positions. During this interval, the output voltage of integrator circuit 46 will be increasing, as shown in Fig. 7. Potentiometer tap 56 will be at or near the upper end of potentiometer 57, as viewed in Fig. 3, so that the voltage on lead 39 will be substantially the same as the voltage across the terminals of potentiometer 57. At the end of the interval $t_1$, switch 75 will be closed by cam 73 to switch relays 48, 91, and 103 to their actuated positions. The output of circuit 45 will be decoupled from input of integrating circuit 53. The voltage across potentiometer 57 will no longer increase, and the geophones 1 through 12 will be coupled to the recording means through their respective reflection-amplifiers. The gain of the reflection-amplifiers will be at a minimum value, as shown in Fig. 9. As the recording drum continues to revolve, the tap 56 will be driven into that portion of non-linear potentiometer 57 whereat there is a considerable change in resistance as the tap approaches the grounded end of the potentiometer. The voltage appearing between tap 56 and ground will gradually decay, as shown in Fig. 8, during the interval $t_2$. The gain of the reflection-amplifiers coupled to potentiometer tap 56 by means of lead 39 will increase as the voltage at tap 56 decreases so that electrical signals produced by late-arriving seismic waves will be considerably amplified.

Figure 4:
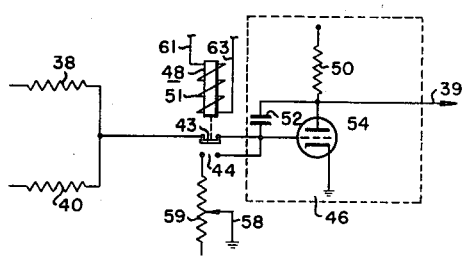
Fig. 4 is a modification of a portion of the circuitry of Fig. 3 illustrating another embodiment of the invention.

Fig. 4 illustrates an alternative embodiment of the invention. The juncture of adding resistors 38 and 40 is connected to the grid of tube 54 by normally-closed contact 43 as described above with respect to Fig. 3. However, potentiometer 57 is eliminated, and a resistor 59, which may be variable, is connected between the grid of vacuum tube 54 and ground upon closure of normally-open contacts 44 of relay 48. Until relay 48 is actuated, the voltage between the grid and plate of the integrating circuit 46 will increase, as shown in Fig. 7. On the end of interval $t_1$ resistor 59 will be switched into the circuit to exponentially discharge the integrating capacitor. The voltage appearing between plate and cathode of the integrating circuit will exponentially decay in the same manner as a charged capacitor shunted by a resistor with the Miller time constant. The tap 58 on resistor 59 may be varied to obtain the desired decay function for the output voltage of the integrating circuit.

Manifestly, the objects set forth above will be achieved by the invention. The invention provides a ready means for amplifying, recording, and subsequently reproducing seismic signals, in a way to retain their original amplitude relationship, inasmuch as the peak voltage appearing on lead 39 can be readily determined by peak reading voltmeter or other suitable means, and since the decay function of the output voltage appearing on lead 39 is known. The output voltage of integrating circuit 53 has been found to be indicative of the amount of energy coupled to the earth to at least a first order of accuracy. Since both the peak and instantaneous values of the voltage appearing on lead 39 are known, the instantaneous gain of the amplifiers and the relationship of the output signals of the seismic amplifiers to the output signals of the geophones can be readily determined.

The invention is not to be restricted to the specific structural details, arrangement of parts, or circuit connections herein set forth, as various modifications thereof may be effected without departing from the spirit and scope of this invention.

What is claimed is:

1. In apparatus for recording a series of electrical oscillating signals having an initial high amplitude wave group, followed in time by a wave train of initially high amplitude and subsequently decaying amplitude, but with one or more transient high amplitude wave groups: electrical amplifier means for said oscillating signals; rectifier means for rectifying said oscillating signals; integrating means for deriving a control voltage proportional to the time integral of the output of said rectifier means between predetermined time limits; means coupling said rectifier means to said integrating means adapted to decouple said rectifier means from said integrating means subsequent to the reception by said rectifier of the first of the transient high amplitude wave groups; means coupled to said integrating means for decreasing the amplitude of said control voltage according to a predetermined time-function, after decoupling of said rectifier means from said integrating means; means coupling said control voltage to said electrical amplifier means for varying the gain of said electrical amplifier means as a function of the amplitude of said control voltage; and means coupled to said electrical amplifier means adapted to record the electrical output signals thereof.

2. In apparatus for recording electrical output signals from a plurality of geophones located according to a predetermined pattern with respect to a shot point at which an explosive charge is to be detonated, the electrical output signals from each of said geophones after detonation of said charge comprising an initial high amplitude wave group followed by a wave train of initially high amplitude and subsequently decaying amplitude with one or more transient high amplitude wave groups, including means for recording electrical signals, and a plurality of electrical amplifier means individually coupling said geophones to said recording means, the improvement comprising: rectifier means for rectifying the output signals of at least two of the geophones; electrical adding circuit means coupled to said rectifier means for adding together the output signals of said rectifier means; integrating circuit means coupled to said adding circuit means for producing an output voltage having an amplitude proportional to the time integral over a predetermined interval of the output of said adding circuit means; means coupling said rectifier means to said integrating means adapted to decouple said rectifier means from said integrating circuit means at the end of said predetermined interval of time after detonation of said explosive charge; said predetermined interval of time being substantially equal to the time required for reception of first arrivals of seismic waves reflected from a subsurface strata, at one of said at least two geophones that is removed from said shot point; variable resistance means coupled to said recording means adapted to vary said integrating circuit output voltage as a time-function in accordance with the speed of said recording means; and circuit means coupling said resistance element means to said electrical amplifier means adapted to control the amplification of said electrical amplifier means as a function of the amplitude of said output voltage.

3. In apparatus for recording a series of electrical signals having an initial high amplitude wave group, followed in time by a wave train of initially high amplitude and subsequently decaying amplitude, but with one or more transient high amplitude wave groups including electrical amplifier means for said oscillating signals adapted to couple said oscillating signals to a recording medium, the improvement comprising: gain control means for said electrical amplifier means including rectifier means for rectifying said oscillating signals; integrating means for deriving a control voltage proportional to the time integral of the output of said rectifier means between predetermined time limits; means coupling said rectifier means to said integrating means adapted to decouple said rectifier from said integrating means subsequent to the reception by said rectifier of said initial high amplitude wave group and the first of said one or more transient high amplitude wave groups; means for decreasing the amplitude of said control voltage according to a predetermined time-function, after decoupling of said rectifier means from said integrating means; and means coupling said control voltage to said electrical amplifier means for varying the gain of said electrical amplifier means as a function of the amplitude of said control voltage.

4. Apparatus for amplifying the output signals of geophones comprising an initial high amplitude wave group followed by a wave train of initially high amplitude and subsequently decaying amplitude with one or more transient high amplitude wave groups, said apparatus comprising: variable gain electrical amplifier means; a voltage integrating circuit; coupling means, including rectifier means, adapted to couple the geophone output signals to said voltage integrating means after rectification of the geophone output signals by said rectifier means until the first of the one or more transient high amplitude wave groups is received by said integrating means, and to thereupon decouple the geophone output signals from said voltage integrating circuit; circuit means coupled to said integrating circuit adapted to derive an amplifier control voltage that is initially proportional to the voltage produced by said integrating circuit when said integrating circuit is decoupled from the geophone output signals, and that thereafter logarithmically diminishes as a function of time; and means coupling said circuit means to said electrical amplifier means adapted to vary the gain of said electrical amplifier means inversely as the amplitude of said control voltage.

5. Apparatus for amplifying output signals of geophones comprising an initial high amplitude wave group followed by a wave train of initially high amplitude and subsequently decaying amplitude with one or more transient high amplitude wave groups, said apparatus comprising: variable gain electrical amplifier means coupled to the geophones for amplifying the output signals thereof; a recorder for recording the output signals of said amplifier means as a function of time; a voltage integrating circuit; coupling means including rectifier means adapted to couple the geophone output signals to said voltage integrating circuit after rectification of the geophone output signals by said rectifier means until the first of the one or more transient high amplitude wave groups is received by said integrating means, and to thereupon decouple the geophone output signals from said integrating circuit; resistor means electrically coupled to the output of said integrating means, said resistor means having a variable tap operatively coupled to said recorder and variable thereby to produce a logarithmically diminishing output voltage initially proportional to the output voltage of said integrating circuit when said integrating circuit is decoupled from the geophone output signals; and means coupling said resistor to said electrical amplifier means adapted to vary the gain of said amplifier means inversely proportional to the voltage at said tap.

References Cited in the file of this patent

UNITED STATES PATENTS

| | | |
|---|---|---|
| 2,276,709 | Wyckoff | Mar. 17, 1942 |
| 2,316,354 | Moritz | Apr. 13, 1943 |
| 2,364,755 | Ritzmann | Dec. 12, 1944 |
| 2,461,173 | Parr | Feb. 8, 1949 |
| 2,673,899 | Montgomery | Mar. 30, 1954 |
| 2,731,520 | Richardson | Jan. 17, 1956 |
| 2,835,746 | Montgomery | May 20, 1958 |